(No Model.)
P. N. APPLEGATE.
COMBINED HARROW, LEVELER, AND CULTIVATOR.
No. 382,204. Patented May 1, 1888.
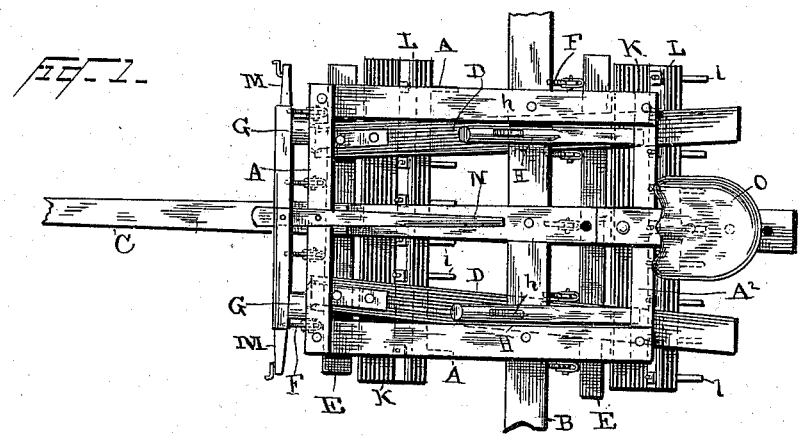
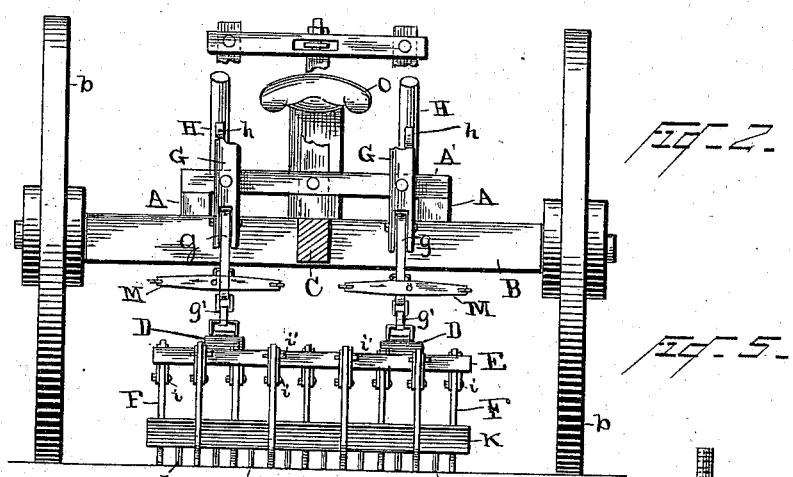
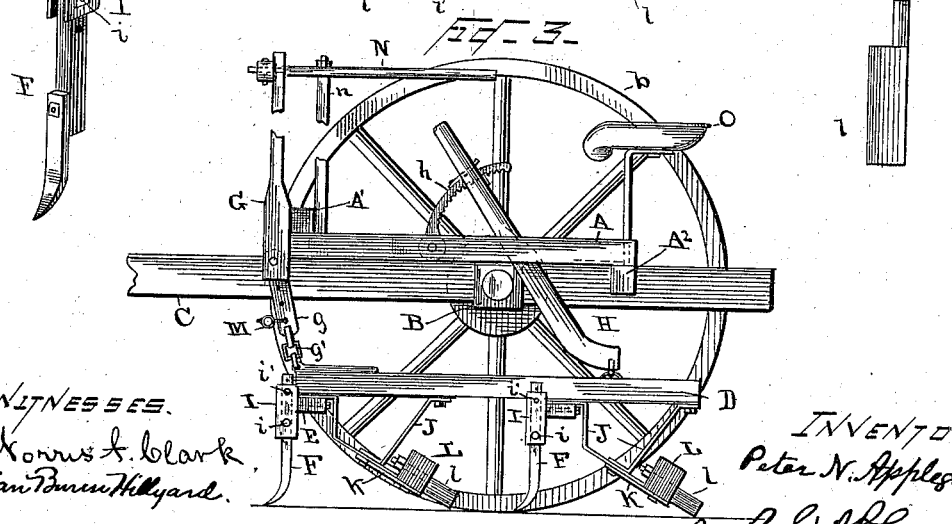
WITNESSES.
Norris A. Clark
Van Buren Hillyard.
INVENTOR.
Peter N. Applegat
By R. S. & A. P. Lacey.

UNITED STATES PATENT OFFICE.

PETER N. APPLEGATE, OF KIMBALL, INDIANA.

COMBINED HARROW, LEVELER, AND CULTIVATOR.

SPECIFICATION forming part of Letters Patent No. 382,204, dated May 1, 1888.

Application filed January 3, 1888. Serial No. 259,577. (No model.)

*To all whom it may concern:*

Be it known that I, PETER N. APPLEGATE, a citizen of the United States, residing at Kimball, in the county of Owen and State of Indiana, have invented certain new and useful Improvements in a Combined Harrow, Leveler, and Cultivator; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined harrow, leveler, and cultivator, and has for its object the production of an agricultural implement which will open up the land to any desired depth within certain limits, level the ground thus broken up, and pulverize and loosen the earth to prepare a very fine seed-bed. The earth-tilling devices are adapted to be drawn over the ground without any rolling support; but as it is preferred to support them on a truck they will be shown and described in relation to said truck. The frame supporting the earth-tilling devices is adjustably connected with the frame of the truck, so that either end can be moved up and down independently of the other end, or both ends be moved together either in the same or opposite directions, and is capable of being guided to the right and left independently of the truck.

The improvements consist of the details of construction and peculiar combinations of parts, which will be more fully hereinafter set forth and claimed, and shown in the annexed drawings, in which—

Figure 1 is a top plan view of a cultivator of my invention; Fig. 2, a front view, parts being broken away, of the cultivator; Fig. 3, a side view, parts being broken away, of the cultivator. Fig. 4 is a detail perspective view of the earth-opener or plow-point, showing the means for adjustably connecting it with the cultivator-bar; and Fig. 5, a detail side view of an earth-pulverizing tooth and sod-cutter.

The truck which supports the earth-tilling devices is composed of the side beams, A, the front beam, A', and the rear beam, A², the axle B having the wheels b at each end, and the tongue or pole C.

The frame which supports the earth tilling and treating devices is composed of the side bars, D, and the end bars, E, which connect the side bars. These end bars, E, form supports for the earth-openers or cultivator-teeth F, and will be designated as "cultivator-bars." The front end of the frame is adjustably connected at each corner with the truck-frame by the links g and levers G, the levers G being pivotally connected near their lower ends with the bar A', and having the links g pivotally connected with their lower ends. These links g are provided with a series of openings in their length, and the short chains g', which are fastened to the bars E, are constructed to fit in any of the said openings and connect the said frame E E and D D with the truck-frame, in the manner hereinbefore described.

The rear end of the frame E E and D D is connected with the levers H, which are pivoted to the side beams, A, and have their front ends adjustably connected with the said side beams, A, by any well-known means, as the segmental racks h.

The clips I, secured at intervals to the cultivator bars, are composed of parallel plates open on their front end and closed on their rear end, and the cultivator-teeth are fitted to the clips between the plates and secured thereto by two pins, i and i', two pins being provided for each cultivator-tooth, the one i being of metal, the other, i', being of frangible material—as wood—to break when the tooth strikes against a hard and unyielding substance, so as to prevent injury to the machine and breakage of the tooth. The shank of the tooth is provided with a series of perforations, through any two of which the pins i and i' are adapted to pass for adjustably connecting the tooth with a clip, I, of the cultivator-bar.

The brackets J, of skeleton form, have their lower ends slanting and adapted to receive the leveling-bar K, which is preferably of thin flat metal, although other material may be used equally as well and with probably as good results. The pulverizing-bars L, supported on the rear ends of the brackets directly above the rear edge of the leveling-bar, are provided with pulverizing or cutting teeth

*l*, which are thin and wide blades having their cutting-edges about on the same slant as the leveling-bar and adapted to make a draw cut, so as to sever the clods and sods of earth the more easily. These cutters or pulverizers have threaded shanks, which pass through the bars L, and are secured thereto by nuts screwed on the projecting ends of the shanks.

The draft is applied to the whiffletrees M, which are applied to the links *g* and adjustable thereon to regulate the force necessary to hold the frame carrying the earth-tilling devices down.

The levers G extend vertically and are united at their upper ends by the bar G', which has a pivotal connection at each end with the levers and serves to move both simultaneously. The bar G' is moved to the right and left to guide the earth-treating frame and devices laterally by the hand-lever N, which is pivoted to the standard *n*, projecting up from the truck-frame, and extends within convenient reach of the driver's seat O, which is adjustable on the tongue, to and from the axle, to balance the machine and relieve the weight from the animal's neck.

The frame D D and E E, which, for the sake of convenience, will be referred to in the claims as the "cultivator-frame," can be lifted from the ground at a moment's notice by depressing the front ends of the levers H. This operation moves the frame rearwardly and upwardly. The rearward movement of the frame is of great consequence, as it disengages the earth-treating devices from the ground impacted against their front edges and renders comparatively easy the task of lifting the said cultivator-frame, as will be readily appreciated.

It will be observed that the teeth *l* of one bar L come opposite the spaces between the teeth *l* of the other bar L, thereby more thoroughly breaking up and disintegrating the clods of earth and producing a much finer seed-bed than if one set of teeth trailed in the track of the other set.

Having thus described my invention, what I claim, and desire to secure by Letters Patent, is—

1. The combination, with the truck and the cultivator-frame, of the vertical levers G, pivoted to swing laterally and having their lower ends connected with and supporting the front end of the cultivator-frame, and the levers H, having their lower ends connected directly with and supporting the rear end of the frame, substantially as set forth, for the purpose described.

2. The combination, with the truck and the cultivator-frames, of the vertical levers united at their upper ends, the standard *n*, the hand-lever N, which guides the cultivators at the forward end instead of rear, the links pivotally connected with the lower ends of the levers and having a series of openings in their length, and the short chains for adjustably connecting the cultivator-frames with the links, substantially as and for the purpose described.

3. The combination, with the truck and the cultivator-frames provided with the earth-treating devices, of the levers H, having their lower ends connected directly with the frames, the levers G, mounted and united to move laterally together, the links *g*, having a series of openings in their length, the short chains *g'*, and the whiffletrees applied to the links *g* and adjustable thereon, substantially as and for the purpose described.

4. The herein-described agricultural implement, composed of the truck, the adjustable seat, the cultivator-frames, the levers supporting the rear end of the cultivator-frames, the levers G, the standard *n*, the hand-lever N, the links *g*, having a series of perforations in their length, the whiffletrees adjustable on the links, the adjustable ground-openers, the brackets having slanting ends, the leveler-bars, the pulverizing-bars, and the pulverizing-teeth placed on the pulverizing-bars, the teeth of one bar coming opposite the spaces between the teeth of the other bar, substantially as described.

In testimony whereof I affix my signature in presence of two witnesses.

PETER N. APPLEGATE.

Witnesses:
WASHINGTON WATSON,
WILLIAM NEAL.